May 28, 1957     F. J. SHORTEN ET AL     2,793,480
METHOD OF AND APPARATUS FOR PRODUCING THERMOMETERS
Filed Nov. 29, 1955
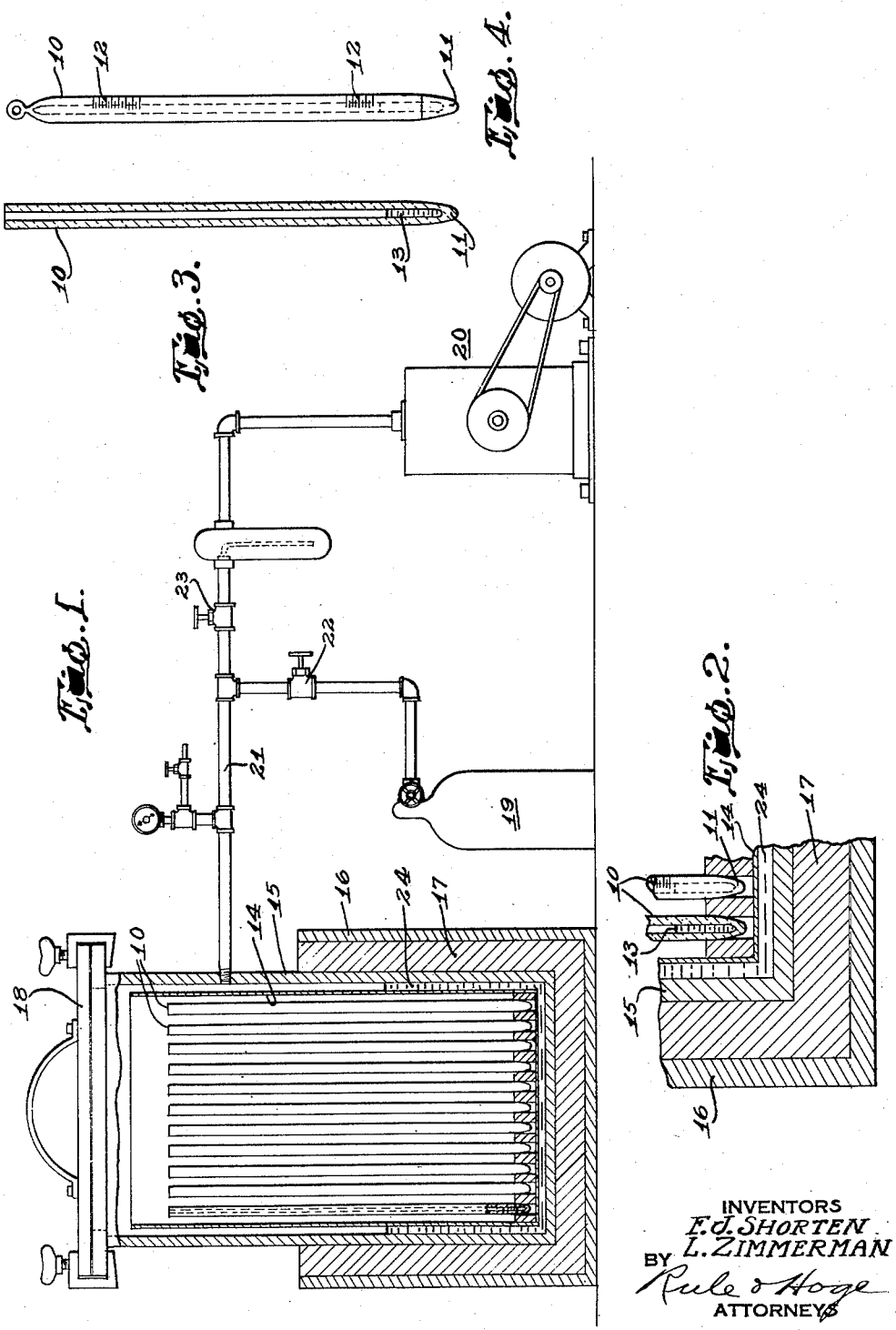
INVENTORS
F. J. SHORTEN
L. ZIMMERMAN
BY
ATTORNEYS United States Patent Office 2,793,480
Patented May 28, 1957

2,793,480

METHOD OF AND APPARATUS FOR PRODUCING THERMOMETERS

Frederick J. Shorten and Luther Zimmerman, Vineland, N. J., assignors to Owens-Illinois Glass Company, a corporation of Ohio Application November 29, 1955, Serial No. 549,702

7 Claims. (Cl. 53—12)

The present invention is an improved method of and apparatus for producing graduated glass tube thermometers.

The entrapment of air and/or moisture in thermometer tubes is highly objectionable in that contact of air with the mercury in the tube produces red, yellow and black oxides of mercury which may quite seriously affect the accuracy of the thermometer.

The presence of moisture or water vapor in the tube above the mercury is very objectionable because such vapor condenses on the mercury at low temperatures and later becomes suspended in the mercury. At high temperatures the suspended moisture splits the mercury column or produces gas bubbles. In either event, the accuracy of the thermometer is affected adversely.

An object of our invention is the provision of a simple method and apparatus for entirely overcoming the above objections. A further object is the provision of a novel method and apparatus for removing the air and moisture from a thermometer tube, substituting an inert gas for the removed air and moisture and sealing the tube to permanently entrap the gas in the latter along with the mercury.

Another object of our invention is the provision of novel and effective apparatus for removing the air and moisture from mercury containing glass thermometer tubes, and substituting an inert gas for same in such fashion that pressure on the mercury is increased with the result that its boiling point is raised and the useful range of the thermometer is materially extended.

Other objects will be in part apparent and in part pointed out hereinafter.

In the drawings:

Fig. 1 is a sectional elevational view; schematic to some extent, showing the apparatus of our invention.

Fig. 2 is an enlarged fragmentary sectional view of a part of the apparatus involved.

Fig. 3 is a longitudinal sectional view of a thermometer tube with a measured quantity of mercury therein.

Fig. 4 is an elevational view of the completed sealed thermometer tube.

In accordance with our invention, a glass thermometer tube 10 of conventional form and having a closed lower end 11 as well as the usual graduation marks 12 along its exterior surface, is charged with a measured quantity of mercury 13. Obviously the space above the mercury level is occupied by air and moisture. As explained heretofore, the results of sealing in such air and moisture along with the mercury are highly objectionable for the specific reasons stated.

Accordingly, we take these tubes at this stage and place them upright in a rack or holder 14 and then position the rack in a closable vacuum chamber 15. This chamber is partially inclosed in a receptable 16 and between the side walls and bottom of the chamber 15 and receptacle 16 is a mass of Dry Ice 17 or like coolant. Between the tube holder 14 and the bottom and adjacent side walls of the chamber we interpose a blanket 24 of mercury. This mercury and the Dry Ice extract and conduct heat away from the thermometer tubes and result in lowering the mercury level in such tubes below the lowest reading point or graduation line 12. In the meantime, the chamber 15 will have been tightly sealed by means of a cover plate or lid 18. With the mercury level thus lowered, the air and moisture are removed from the receptacle 16 and the thermometer tubes 10 by alternate flushing with nitrogen from a supply tank 19 and air evacuation as effected by a vacuumizing unit 20. Both are connected by a pipe 21 to the chamber 15. A valve 22 regulates the flow of nitrogen and another valve 23 controls the vacuumizing operation.

Upon completion of the air and moisture removal and with the temperature of the thermometer tubes somewhere between about 0° and +15° C., which insures maintaining the mercury level in the tubes below the lowermost reading point, an inert gas which may be nitrogen, carbon dioxide or helium, is introduced to fill the space above the mercury level.

Steps are then taken to reduce the vacuum in the chamber 15 and the chamber then is opened and the holder or rack removed. Prior to any appreciable rise in the mercury level and in any event before it reaches the lowermost reading point the open upper ends of the tubes are sealed in conventional fashion. Thus we entrap the inert gas in the tubes and avoid the objectionable conditions noted heretofore. Incident to the subsequent rise in the level of the mercury, a positive pressure of the order of one (1) atmosphere will be created. Such, as stated heretofore, extends the useful range of a mercury tube thermometer by raising the boiling point of the contained mercury.

Modifications may be resorted to within the spirit and scope of the appended claims.

We claim:

1. The method of producing a glass tube mercury thermometer which consists in introducing a measured quantity of mercury into an upwardly facing open end of an otherwise closed graduated glass thermometer tube; chilling the thermometer tube to thereby lower the level of the mercury therein, exhausting the air and moisture from the tube above the upper surface of the mercury, introducing an inert gas into the tube to fill the space above the mercury level and sealing the upper end of the tube prior to the occurrence of any substantial rise in the mercury level and thereby entrapping the inert gas in said tube.

2. The method defined in claim 1, the inert gas being nitrogen.

3. The method of producing a glass tube mercury thermometer which consists in placing a graduated glass tube with an open end uppermost and with a measured quantity of mercury therein in a closable vacuum chamber, effecting intense localized chilling of the mercury containing end of the tube to thereby lower the mercury to a point below the lowest reading point on the tube, exhausting the air and moisture from the chamber and from the tube above the upper surface of the mercury, introducing an inert gas into the exhausted air space above the mercury, removing the thermometer tube from the chamber and sealing the open upper end of same prior to the occurrence of any substantial rise in the mercury level to thereby entrap the inert gas in the tube.

4. The method defined in claim 1 in which the chilling is sufficient to move the level of the mercury to a point below the lowest graduation on the tube and initially affects the closed end of the tube.

5. The method defined in claim 3 in which the thermometer tube temperature is maintained substantially constant from the time it is removed from the vacuum chamber until sealing of the open upper end has been completed.

6. In apparatus of the character described, an open top receptable, a vacuum chamber nested within said receptacle, a coolant interposed between the adjacent surfaces of the chamber and receptacle, a holder for thermometer tubes arranged within said vacuum chamber to support mercury containing tubes with open upper ends in upright positions, and means for exhausting the air and contained moisture from the chamber and tubes and introducing an inert gas into said chamber and tubes to fill the latter above the mercury.

7. The apparatus defined in claim 6 and means for alternately introducing the inert gas and vacuumizing the chamber and tubes.

References Cited in the file of this patent

UNITED STATES PATENTS

| | | |
|---|---|---|
| 2,324,556 | Brown | July 20, 1943 |
| 2,353,985 | Barr | July 18, 1944 |
| 2,622,779 | Smith et al. | Dec. 23, 1952 |